United States Patent [19]
Abbott

[11] Patent Number: 5,935,719
[45] Date of Patent: Aug. 10, 1999

[54] LEAD-FREE, NICKEL-FREE AND CYANIDE-FREE PLATING FINISH FOR SEMICONDUCTOR LEADFRAMES

[75] Inventor: Donald C. Abbott, Norton, Mass.

[73] Assignee: Texas Instruments Incorporated, Dallas, Tex.

[21] Appl. No.: 09/141,856

[22] Filed: Aug. 28, 1998

Related U.S. Application Data

[60] Provisional application No. 60/057,599, Aug. 29, 1997.
[51] Int. Cl.⁶ ..................................................... B32B 15/01
[52] U.S. Cl. .......................... 428/669; 257/706; 420/485; 357/71
[58] Field of Search ..................................... 257/706, 666; 357/71; 420/485; 428/620, 670, 669; 361/813; 437/209

[56] References Cited

U.S. PATENT DOCUMENTS 5,650,663  7/1997  Parthasarathi ............................. 257/706

*Primary Examiner*—Deborah Jones
*Assistant Examiner*—Darlene Daird
*Attorney, Agent, or Firm*—Wade James Brady, III; Richard L. Donaldson

[57]  ABSTRACT

A leadframe and method of fabrication of the leadframe. A leadframe is formed from one of copper or copper-based material and a coating of palladium is formed over the leadframe. Optionally, a layer of from about 10 to about 95 percent copper by weight and the remainder palladium is deposited between the leadframe and the coating of palladium. The coating of palladium is from about 3 to about 10 microinches and preferably about 3 microinches. The palladium/copper layer is from about 5 to about 40 microinches and preferably about 10 microinches. A semiconductor device is fabricated by providing a copper or copper-based lead frame and forming a layer of palladium over the leadframe. Optionally, a layer of palladium and copper is formed between the leadframe and the layer of palladium.

15 Claims, 1 Drawing Sheet

LEAD-FREE, NICKEL-FREE AND CYANIDE-FREE PLATING FINISH FOR SEMICONDUCTOR LEADFRAMES

CROSS REFERENCE TO RELATED APPLICATIONS

This application claims priority under 35 USC § 199(e)(1) of provisional application Ser. No. 60/057,599 filed Aug. 29, 1997.

This invention is related to Ser. No. 08/190,729 and Ser. No. 08/485,077, the contents of which are incorporated herein in their entirety by reference.

BACKGROUND OF THE INVENTION

1. Field of the Invention

This invention relates to leadframes and methods of fabrication of such leadframes.

2. Brief Description of the Prior Art

In the fabrication of semiconductor devices, semiconductor integrated circuit chips are generally secured to leadframes with bond pads on the chips being coupled to inner leads of the leadframe by way of gold wires. The leadframes make the electrical connection of the integrated circuit to the circuit board possible. To accomplish this purpose, the leadframes provide gold wire bondable inner lead surfaces to allow connection of the gold wire from the integrated circuit bond pad to the leadframe inner lead by bonding, as well as a flat surface to which the integrated circuit chip is attached. The chip and inner leads with wire bonds are then encapsulated in plastic and the external leads, which remain external to the plastic encapsulation, must then be solderable to the printed circuit board surface, typically using a solder paste.

In the prior art, the external leads, after encapsulation of the chip and internal leads with gold wires, have been either dipped in molten solder, which is generally an alloy of tin and lead, or plated with the tin/lead solder to preserve the solderability of the external leads. The internal lead tips had been silver spot plated during lead frame manufacture prior to chip attach to allow gold wire bonding. A lead finish was thereafter introduced into the art based upon nickel and palladium which eliminated the use of solder and consequently the lead and tin contained in the solder from the leadframe as well as eliminating the silver spot plating. This has proven over time to be a stable and robust lead finish with demonstrable benefits. The drawback to this system is that is contains nickel, which is a target, albeit of lower importance than lead, of environmental concern. The deposition of nickel is also time consuming and requires rather extensive and expensive waste treatment facilities. It is therefore apparent that elimination of the nickel and/or replacement of the nickel with a more environmentally and/or economically friendly material is highly desirable.

SUMMARY OF THE INVENTION

In accordance with the present invention, the above described problems of the prior art are minimized if not eliminated.

Briefly, a leadframe finish and fabrication technique is provided which eliminates the use of nickel. The leadframe finish takes either the form of palladium plated directly onto a copper base metal leadframe or palladium plated onto a palladium/copper alloy or codeposited palladium and copper which has been plated or deposited onto a copper base metal leadframe. The palladium/copper alloy or codeposition has from about 5 to about 90 percent by weight palladium and the remainder substantially copper, the ratio preferably being about 10 percent by weight palladium and 90 percent by weight copper. The fabrication technique (die attach, wire bond) preferably requires that the processing temperature/time function be sufficiently low subsequent to the deposition or plating of the palladium layer to avoid the migration of copper atoms into the palladium layer formed thereover.

After encapsulation of the integrated circuit chip, leadframe leads extend externally from of the encapsulated package. The terminal portions of these leads which extend out of the package, which are copper or copper based material, have been optionally plated with palladium and copper in the ratio desired having a thickness of from about 5 microinches to about 40 microinches and preferably about 20 microinches. Alternatively, the copper/palladium layer can be formed by codeposition of the two metals. The leadframe, during manufacture, had been placed in a bath containing complexed palladium ions and plated until the palladium layer over the combined palladium/copper layer is from about 3 microinches to about 10 microinches and preferably about 3 microinches. The palladium/copper layer acts as a barrier to the dissolution of the copper into the palladium bath as well as to the migration of copper into the palladium layer, if provided. However, such copper migration is minimal, at best, when a sufficiently low time/temperature function is used during device assembly. The device is now ready for attachment by soldering to a printed circuit board or the like. All plating is provided during leadframe manufacture with no plating being associated with assembly of the device being fabricated.

It can be seen from the above description that the process flow involves providing of the leadframe with optional plating of the leadframe with copper/palladium followed by a plating of palladium. Then die attach takes place followed by wire bonding and encapsulation. No plating takes place after device assembly.

The advantages derived from the above described procedure are, initially, the elimination of nickel from the leadframe manufacturing process, thereby eliminating the waste treatment costs associated with nickel as well as the plating equipment required for nickel plating. This simplifies the plating process as well as the plating process control over that of the prior art and thereby increases the plating throughput. This greatly eliminates the relatively high costs associated with nickel plating.

DESCRIPTION OF THE PREFERRED EMBODIMENT

Figure 1:
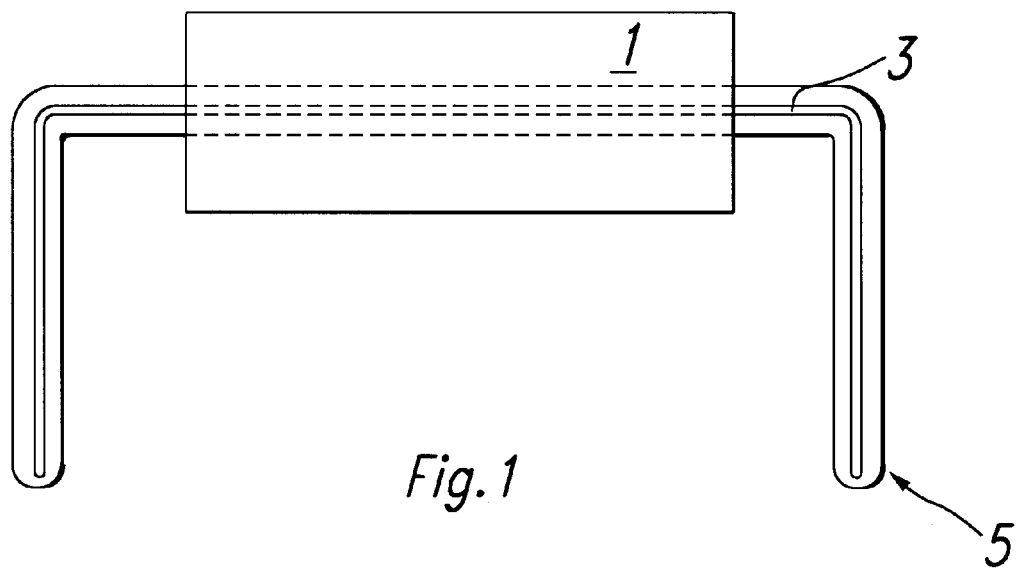
FIG. 1 is a schematic cross sectional diagram of a fabricated semiconductor device with the leads of the leadframe extending from the package containing the chip.

Referring to FIG. 1, there is shown a standard semiconductor package which includes an encapsulated chip portion 1 and leadframe with leads 3 which extend from the leadframe within the package in standard manner. The entire leadframe including the leads 3 is coated with a coating 5 which is either a palladium/copper layer followed by palladium layer or a palladium layer alone. The coating is nickel-free.

Figure 2:
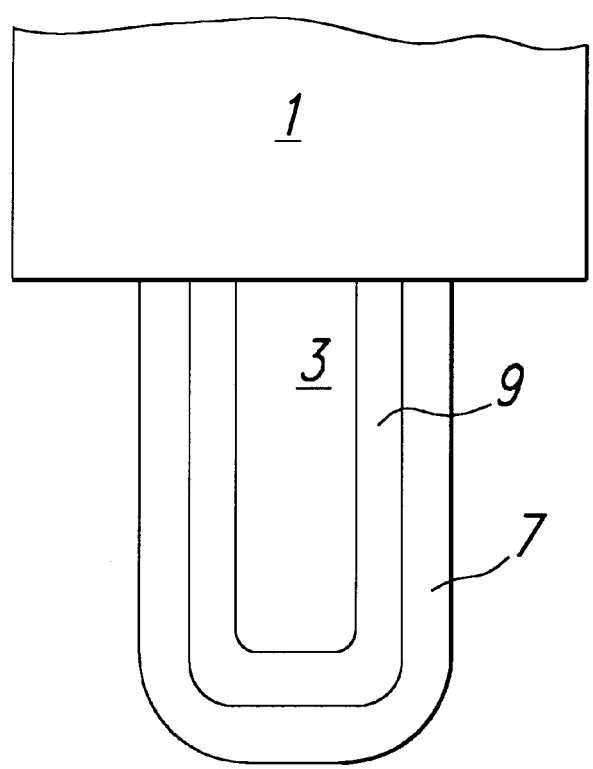
FIG. 2 is an enlarged view of the coated end portion of a lead of FIG. 1.

The lead coating or finish 5, as shown in FIG. 2, takes either the form of palladium 7 plated directly onto a copper base metal leadframe 3 or palladium 7 plated onto a palladium/copper alloy or a codeposited palladium and copper layer 9 which has been plated or deposited onto a copper base metal leadframe. The palladium/copper alloy or codeposition, when used, has about 10 percent by weight palladium and 90 percent by weight copper. The leadframe is then placed in a palladium ion-containing bath and a 3 microinch layer of palladium is deposited over the palladium/copper layer, if used, otherwise directly onto the copper. The fabrication technique preferably requires that the assembly process temperature/time function be sufficiently low subsequent to the deposition or plating of the palladium layer to avoid the migration of copper atoms into the palladium layer formed thereover, this temperature being preferably below about 40 degreees C.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A leadframe structure which comprises:
   (a) a leadframe formed from one of copper or copper-based material; and
   (b) a coating of palladium over said leadframe; and
   (c) a layer of from about 10 to about 95 percent copper by weight and the remainder palladium deposited between said leadframe and said coating of palladium.

2. The leadframe of claim 1 wherein said coating of palladium is from about 3 to about 10 microinches.

3. The leadframe of claim 1 wherein said coating of palladium is about 3 microinches.

4. The leadframe of claim 1 wherein the palladium/copper layer is from about 5 to about 40 microinches.

5. The leadframe of claim 1 wherein the palladium/copper layer is about 5 microinches.

6. The leadframe of claim 2 wherein the palladium/copper layer is from about 5 to about 40 microinches.

7. The leadframe of claim 2 wherein the palladium/copper layer is about 5 microinches.

8. The leadframe of claim 3 wherein the palladium/copper layer is from about 5 to about 40 microinches.

9. The leadframe of claim 3 wherein the palladium/copper layer is about 5 microinches.

10. The leadframe of claim 4 wherein the palladium/copper layer is from about 5 to about 40 microinches.

11. The leadframe of claim 4 wherein the palladium/copper layer is about 40 microinches.

12. The leadframe of claim 5 wherein the palladium/copper layer is from about 5 to about 40 microinches.

13. The leadframe of claim 5 wherein the palladium/copper layer is about 40 microinches.

14. A method of fabricating a semiconductor device which comprises the steps of:
    (a) providing a copper or copper-based leadframe; and
    (b) forming a layer of palladium over said leadframe; and
    (c) forming a layer of palladium and copper between said leadframe and said layer of palladium.

15. The method of claim 14 wherein said layer of palladium is from about 3 to about 10 microinches and said layer of palladium and copper is from about 5 to about 40 microinches.

* * * * *